United States Patent
Tran et al.

(10) Patent No.: US 10,543,673 B2
(45) Date of Patent: Jan. 28, 2020

(54) DETECTING AND COMPENSATING FOR AN ANOMALY IN THREE-DIMENSIONAL OBJECT FABRICATION

(71) Applicant: Microsoft Technology Licensing, LLC, Redmond, WA (US)

(72) Inventors: Khai Nguyen Tran, Kirkland, WA (US); Emmett Walter Lalish, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 15/460,338

(22) Filed: Mar. 16, 2017

(65) Prior Publication Data

US 2018/0264751 A1 Sep. 20, 2018

(51) Int. Cl.
*B29C 67/00* (2017.01)
*B33Y 10/00* (2015.01)
(Continued)

(52) U.S. Cl.
CPC ............... *B33Y 50/02* (2014.12); *B33Y 10/00* (2014.12); *B33Y 30/00* (2014.12)

(58) Field of Classification Search
CPC ... B29C 64/106; B29C 64/386; B29C 64/393; B22F 3/1055; B22F 2003/1057; B33Y 10/00; B33Y 30/00; B33Y 50/02; G05B 19/4099; G05B 2219/49023; G05B 2219/23005

(Continued)

(56) References Cited

U.S. PATENT DOCUMENTS 5,596,504 A * 1/1997 Tata .................... G06T 17/00
345/420
2009/0018685 A1 1/2009 Holzwarth
(Continued)

FOREIGN PATENT DOCUMENTS

CN 103212695 A 7/2013
WO 2011042899 A1 4/2011
(Continued)

OTHER PUBLICATIONS

Horne, Richard, "Reprap development and further adventures in DIY 3D printing", http://richrap.blogspot.in/2015/01/slic3r-advanced-perimeter-tuning-3d.html, Published on: Jan. 8, 2015, 13 pages.

*Primary Examiner* — Alexander M Weddle (57) ABSTRACT

Described herein is a system and method for detecting and compensating for an anomaly in three-dimensional object fabrication. A wall thickness computation component computes a wall thickness of a three-dimensional object to be fabricated. An edge map generation component generates an edge map for one or more portions of the three-dimensional object to be fabricated satisfying one or more wall thickness criteria. The wall thickness criteria includes, for example, a computed wall thickness less than an extrusion width of a fabrication apparatus, a computed wall thickness greater than an extrusion width and less than twice the extrusion width and/or a computed wall thickness not an integer multiple of the extrusion width. A tool path generation component generates a tool path based on the generated edge map.

18 Claims, 8 Drawing Sheets

(51) Int. Cl.
*B33Y 30/00* (2015.01)
*B33Y 50/02* (2015.01)

(58) Field of Classification Search
USPC .......................................................... 264/40.1
See application file for complete search history.

(56) References Cited

U.S. PATENT DOCUMENTS

| | | |
|---|---|---|
| 2011/0070394 A1 | 3/2011 | Hopkins et al. |
| 2014/0297014 A1* | 10/2014 | Iverson .............. G05B 19/4099 |
| | | 700/98 |
| 2015/0045928 A1 | 2/2015 | Perez et al. |
| 2015/0165691 A1* | 6/2015 | Mark ..................... G05B 15/02 |
| | | 700/98 |
| 2015/0246488 A1 | 9/2015 | Boettcher et al. |
| 2015/0269289 A1 | 9/2015 | Kim et al. |
| 2016/0101474 A1 | 4/2016 | Abrahamesen |
| 2016/0274572 A1 | 9/2016 | Littrell et al. |
| 2016/0342150 A1 | 11/2016 | Jin et al. |

FOREIGN PATENT DOCUMENTS

| | | |
|---|---|---|
| WO | 2015111059 A1 | 7/2015 |
| WO | 2016081496 A1 | 5/2016 |

* cited by examiner

DETECTING AND COMPENSATING FOR AN ANOMALY IN THREE-DIMENSIONAL OBJECT FABRICATION

BACKGROUND

Three-dimensional objects can be fabricated by various ways including printing and additive process(es). Further, materials consumed can vary by printer or additive process. In order to generate three-dimensional objects, a representation of the three-dimensional object to be fabricated (e.g., 3MF file) is segmented along the z-axis by a renderer (e.g., a slicer) into two-dimensional slices. These slices are then successively utilized to send instructions to a fabrication apparatus such as a three-dimensional printer in order to fabricate the three-dimensional object.

SUMMARY

Described herein is a system for detecting and compensating for an anomaly in three-dimensional object fabrication comprising a computer comprising a processor and a memory. The memory comprises a wall thickness computation component configured to compute a wall thickness of a three-dimensional object to be fabricated. The memory further comprises an edge map generation component configured to generate an edge map for one or more portions of the three-dimensional object to be fabricated satisfying one or more wall thickness criteria. The memory also comprises a tool path generation component configured to generate a tool path based on the generated edge map.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to detecting and compensating for anomaly(ies) in three-dimensional object fabrication are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding detecting and/or compensating for anomaly(ies) in three-dimensional object fabrication. What follows are one or more exemplary systems and methods.

Aspects of the subject disclosure pertain to the technical problem of detecting and/or compensating for anomaly(ies) (e.g., thin wall(s), missing thin part(s), hole(s) in solid part(s), etc.) when a fabricating three-dimensional object. The technical features associated with addressing this problem involve computing a wall thickness of a three-dimensional object to be fabricated, generating an edge map for one or more portions of the three-dimensional object to be fabricated satisfying one or more wall thickness criteria; and generating a tool path based on the edge map. Accordingly, aspects of these technical features exhibit technical effects of more efficiently and effectively fabricating three-dimensional objects, for example, reducing wasted material and/or wasted fabrication time.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Figure 1:
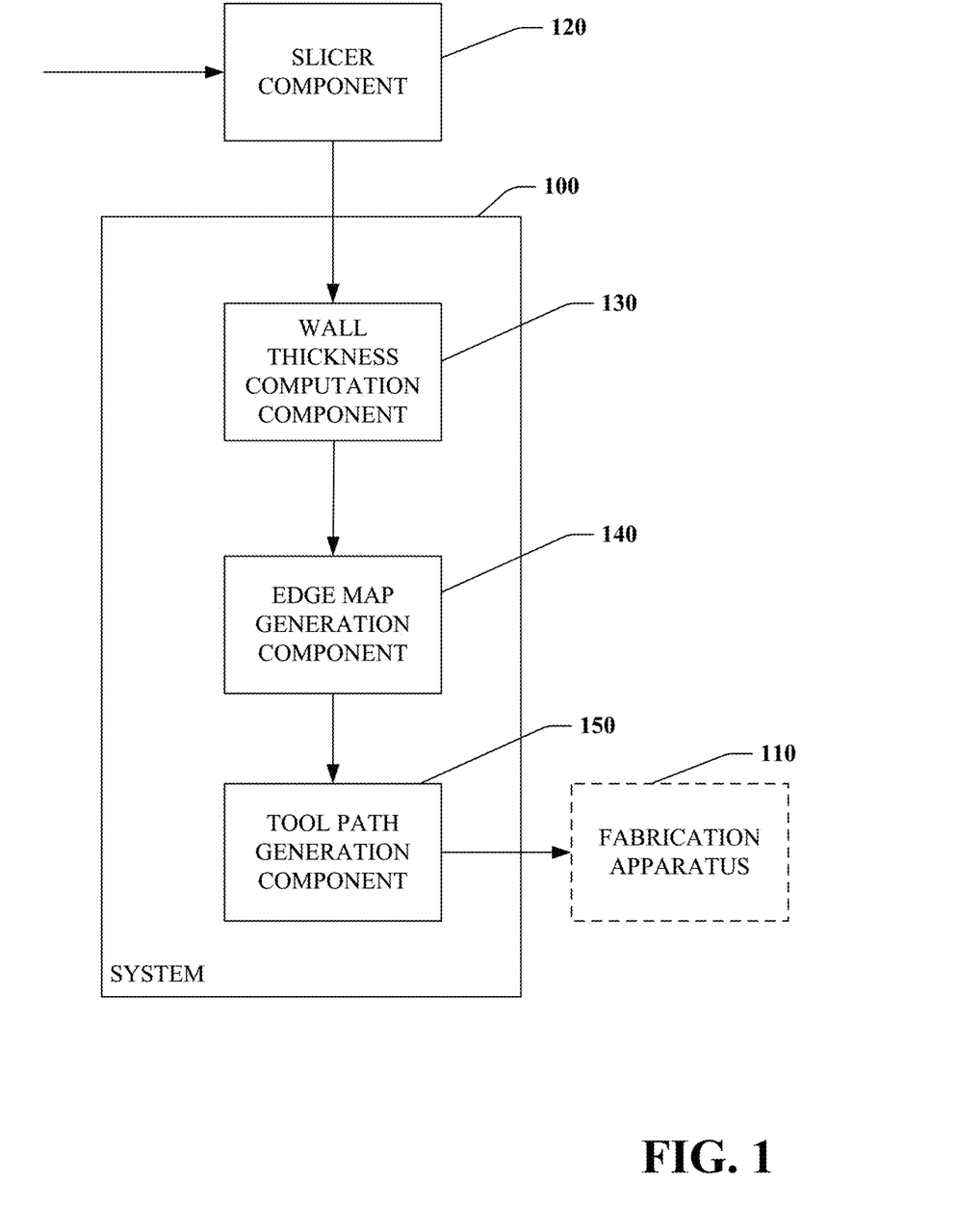
FIG. 1 is a functional block diagram that illustrates a system for detecting and compensating for an anomaly in three-dimensional object fabrication.

Referring to FIG. 1, a system for detecting and compensating for an anomaly in three-dimensional object fabrication 100 is illustrated. The system 100 can detect and compensate for anomaly(ies) (e.g., thin wall(s), missing thin part(s), hole(s) in solid part(s), etc.) when a fabricating three-dimensional object. The system 100 can compute wall thickness(es) of a three-dimensional object to be fabricated, generate an edge map for one or more portions of the three-dimensional object to be fabricated satisfying one or more wall thickness criteria; and generate a tool path based on the edge map. In this manner, three-dimensional object(s) can be more efficiently and effectively fabricated resulting in reduce material waste and/or wasted fabrication time.

Fabrication of the three-dimensional object can be limited, for example, by an extrusion width of a fabrication apparatus 120. In one embodiment, the system 100 is aware of the extrusion width based upon input from a user of the system 100. In one embodiment, the system 100 is aware of the extrusion width based upon information provided electronically by the fabrication apparatus 110.

In one embodiment, the anomaly comprises a thin wall. In one example, object wall(s) of less than the extrusion width have not been successfully fabricated by certain conventional fabrication apparatuses employing conventional technology.

Figure 2:
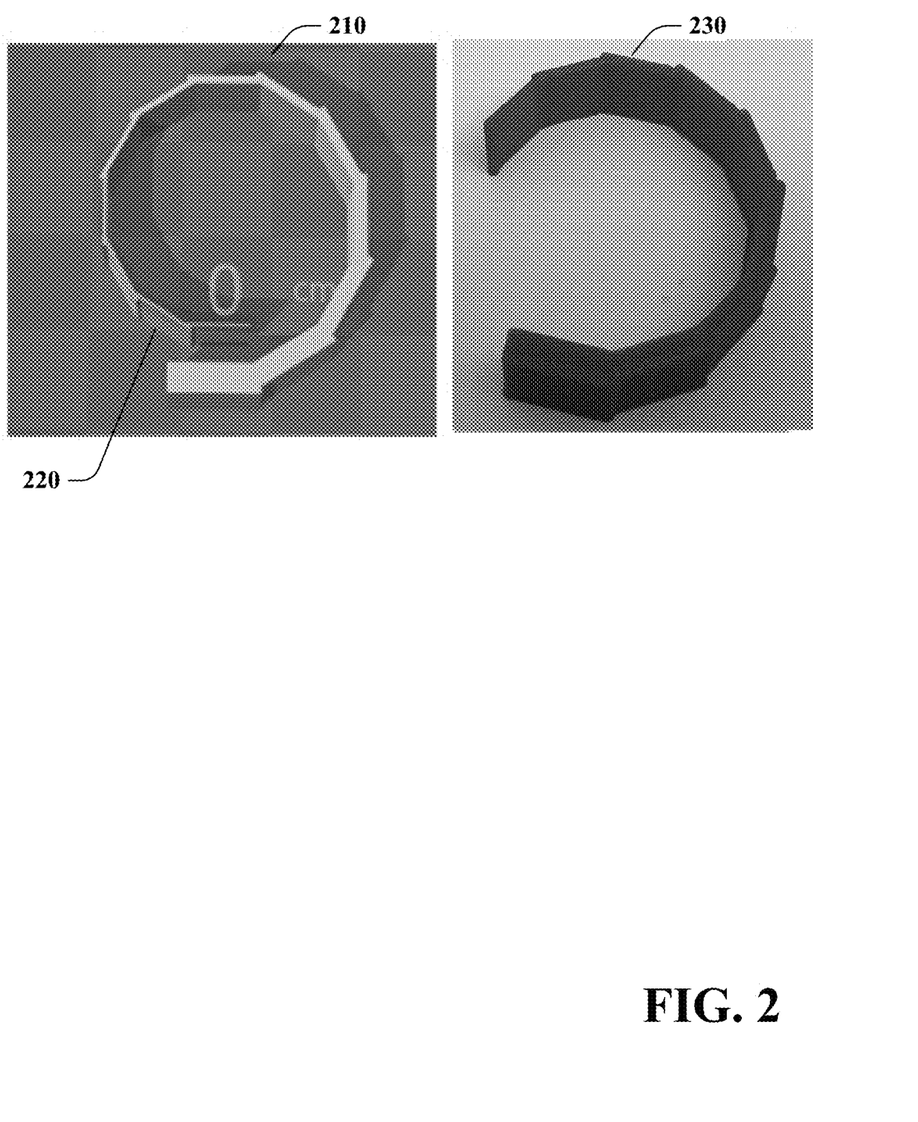
FIG. 2 illustrates an anomaly of an inability to fabricate thin wall part(s).

In one embodiment, the anomaly comprises a missing thin wall part. FIG. 2 illustrates an anomaly of an inability to fabricate thin wall part(s). A model of an object to be fabricated 210 includes a portion 220 that is thinner than a resolution of a fabrication apparatus (e.g., limited by nozzle size, material, material flow, etc.). An object 230 fabricated based on the model 210 is missing a portion (corresponding to the portion 220 of model 210) due to fabrication limitations.

Figure 3:
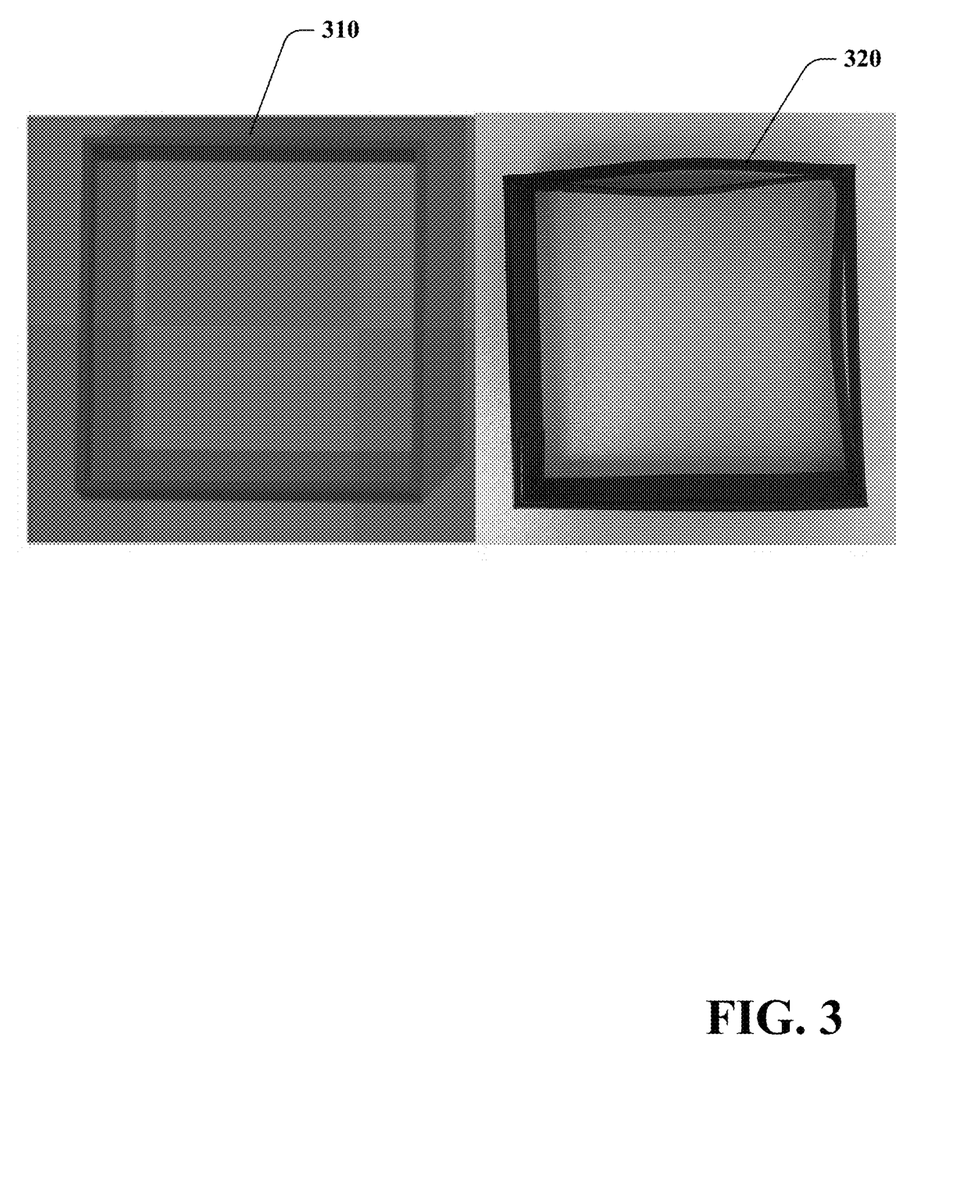
FIG. 3 illustrates an anomaly of a hole in solid parts.
Figure 4:
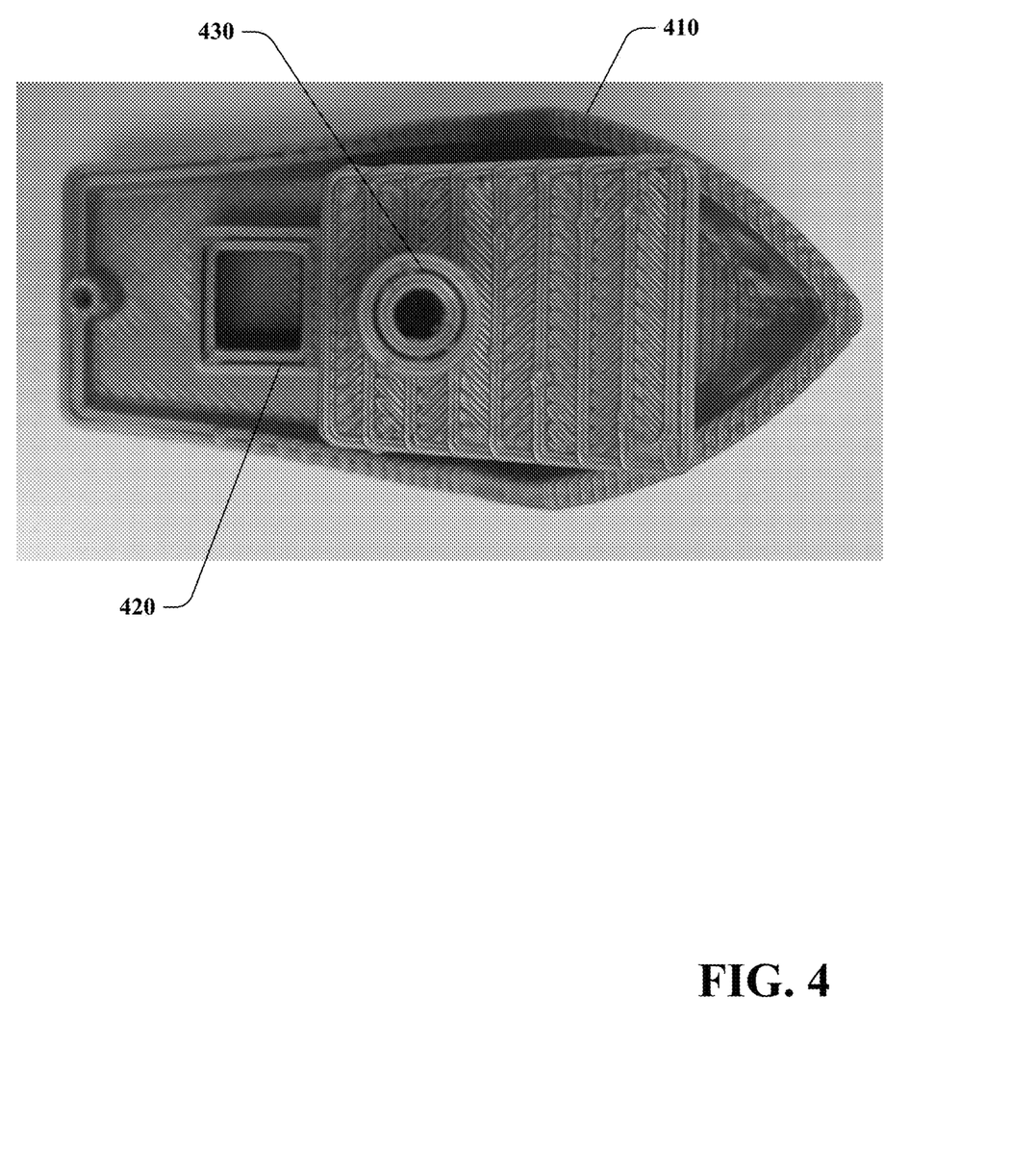
FIG. 4 illustrates an anomaly of a hole in solid parts.

In one embodiment, the anomaly comprises a hole in a solid portion of the three-dimensional object to be fabricated. FIG. 3 illustrates an anomaly of a hole in solid parts. A model of an object to be fabricated 310 depicts substantially solid walls. However, due to resolution limitations of the fabrication apparatus, an object 320 fabricated based on the model 310 comprises holes. FIG. 4 illustrates an anomaly of a hole in solid parts. Due to resolution limitations of the fabrication apparatus, an object 410 fabricated comprises holes 420, 430.

Turning back to FIG. 1, the system 100 can receive information about a portion of the three-dimensional object to be fabricated from a slicer component 120. The slicer component 120 can receive information (e.g., a file) about the three-dimensional object to be fabricated (e.g., printed). In one embodiment, the information comprises a 3D Manufacturing Format file (e.g., 3MF file). The 3MF format describes a set of conventions for the use of XML and other widely available technologies to describe content and appearance of three-dimensional model(s). For example, a 3MF file can include a list of vertices, triangles and meshes for fabricating the three-dimensional object. While the use of 3MF file(s) is discussed herein the subject disclosure is not limited to 3MF files and the subject disclosure can be utilized with any suitable representation of three-dimensional object(s) including, for example, object (OBJ) files, stereo lithography (STL) files, virtual reality modeling language (VRML) files, X3G files, polygon (PLY) files and/or filmbox (FBX) files.

Based on the received information (e.g., file), the slicer component 120 partitions the three-dimensional object to be fabricated into two-dimensional layers. Each of these layers comprises geometric elements such a two-dimensional polygons forming a shell of the three-dimensional object at the particular layer.

The slicer component 120 can provide information regarding a layer (e.g., two-dimensional polygons) to a wall thickness computation component 130 that computes wall thicknesses of the three-dimensional object to be fabricated for the particular layer. In one embodiment, the slicer component 120 provides two-dimensional polygon(s) to the wall thickness component 120 for each slice layer. The wall thickness computation component 130 computes wall thickness(es) for each slice layer.

In one embodiment, the wall thickness computation component 130 employs a straight skeleton technique for computing wall thicknesses of a particular slice layer in order to detect portion(s) and/or region(s) that have a thin wall issue. A straight skeleton method provides a linear skeleton of a given polygon by shrinking the given polygon as a function of time. By using the straight skeleton technique simultaneously on two polygons, point(s) of intersection (e.g., straight skeleton vertices) between the two polygons (e.g., one shrinking inwardly and one growing outwardly) define the midway point between the two polygons.

Figure 5:
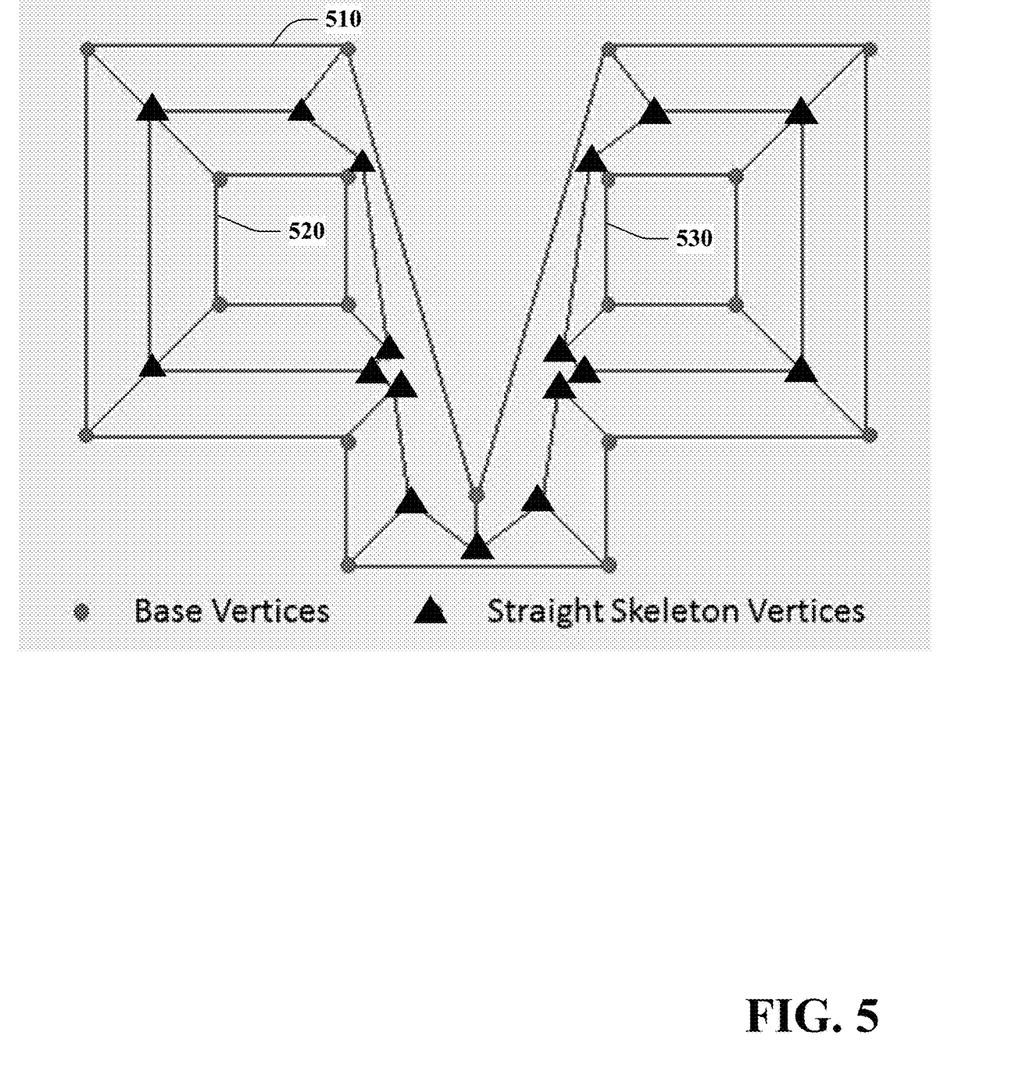
FIG. 5 illustrates a slicer layer having three polygons.

Turning briefly to FIG. 5, a slice layer 500 includes a first polygon 510, a second polygon 520 and a third polygon 530 which define outer boundaries of the three-dimensional object to be fabricated. Base vertices of the polygons 510, 520 and 530 are depicted with a filled circle. Using a straight skeleton technique, straight skeleton vertices (depicted with filled triangles) are determined by the wall thickness computation component 130. The midpoints of the polygons 510, 520, 530 is defined by straight line segments between the straight skeleton vertices.

Returning to FIG. 1, in one embodiment, the wall thickness computation component 130 thus computes straight skeleton vertices of the two-dimensional polygons received from the slicer component 120. Each straight skeleton vertex height (e.g., distance from either of the polygons to the straight skeleton vertex) represents a half of the wall thickness of the two-dimensional polygons received from the slicer component 120. In this example, the wall thickness computation component 130 can calculate the wall thicknesses as twice the straight skeleton vertex heights.

The wall thickness computation component 130 can provide the calculated wall thicknesses to an edge map generation component 120. The edge map generation component 140 can generate an edge map for one or more portions of the three-dimensional object to be fabricated satisfying one or more wall thickness criteria. The edge map represents a connection of computed straight skeleton vertices satisfying the one or more wall thickness criteria.

In one embodiment, the wall thickness criteria comprises thin wall(s) and/or thin wall part(s) that have a computed wall thickness less than an extrusion width of the fabrication apparatus. In this manner, tool paths can be generated that compensate for limitation(s) of the fabrication apparatus. Accordingly, based on the computed wall thickness information, thin wall(s) and/or thin wall part(s) (e.g., polygon edges) that have a thickness less than the extrusion width can be detected. Typically, the slicer component 120 does not successfully generate tool paths for the thin wall(s) and/or thin wall part(s) which can lead to, for example, missing part(s) in fabricated object(s). Tool path refers to instruction(s) (e.g., computer instruction(s)) used by the fabrication apparatus to fabricate at least a portion of a slice of the three-dimensional object to be fabricated. For example, the tool path can include instruction(s) that control movement of a nozzle of the fabrication apparatus in the x-axis and/or the y-axis.

In order to compensate for limitation(s) of the fabrication apparatus, the edge map generation component 140 can build an edge map for part(s) having a wall thickness less than the extrusion width of the fabrication apparatus. From the edge map, the tool path generation component 150 can generate thin wall tool path(s) by iteratively extracting the longest path(s) until the vertices in the edge map are visited (e.g., the edges in the edge map are visited just one time). For generating the thin wall tool paths, the computed wall thickness based on the height information from straight skeleton vertices discussed above can be used to compensate for limitation(s) of the fabrication apparatus, for example, by reducing an effective extrusion width (e.g., by reducing a flow of material which allows for thinner extrusion), slow down the speed of nozzle travel and/or increasing the wall thickness to a minimum threshold to ensure the wall will survive the fabrication process given the limitations of the apparatus.

In one embodiment, the wall thickness criteria comprises thin wall part(s) having a computed wall thickness greater than an extrusion width but less than twice the extrusion width. An edge map is built by the edge map generation component 140 for thin wall parts having a wall thickness greater than the extrusion width and less than twice the extrusion width. From the edge map, the tool path generation component 150 can generate thin wall tool path(s) by iteratively extracting the longest path(s) until the vertices in the edge map are visited (e.g., the edges in the edge map are visited just one time). For generating the thin wall tool paths, the computed wall thickness (based on the height information from straight skeleton vertices discussed above) can be used to compensate for limitation(s) of the fabrication apparatus, for example, by increasing an effective extrusion width (e.g., by increasing a flow of material), generating a double tool path with an extrusion width of half thickness and/or slow down the speed of nozzle travel.

In one embodiment, the wall thickness criteria comprises thickness(es) that are not an integer multiple of the extrusion width (e.g., twice the extrusion width is less than the wall thickness which is less than thrice the extrusion width, thrice the extrusion width is less than the wall thickness which is less than four times the extrusion width, etc.), for example, to reduce gap(s) between perimeter(s). An edge map is built by the edge map generation component 140 for parts that are not a multiple of the extrusion width. From the edge map, the tool path generation component 150 can generate thin wall tool path(s) by iteratively extracting the longest path(s) until the vertices in the edge map are visited (e.g., the edges in the edge map are visited just one time).

The tool path generation component 150 can provide the generated tool path(s) to the fabrication apparatus 150. In one embodiment, the generated tool path(s) are provided as coordinated instructions (e.g., op codes, g-code and/or the like) to the fabrication apparatus 150.

Figure 6:
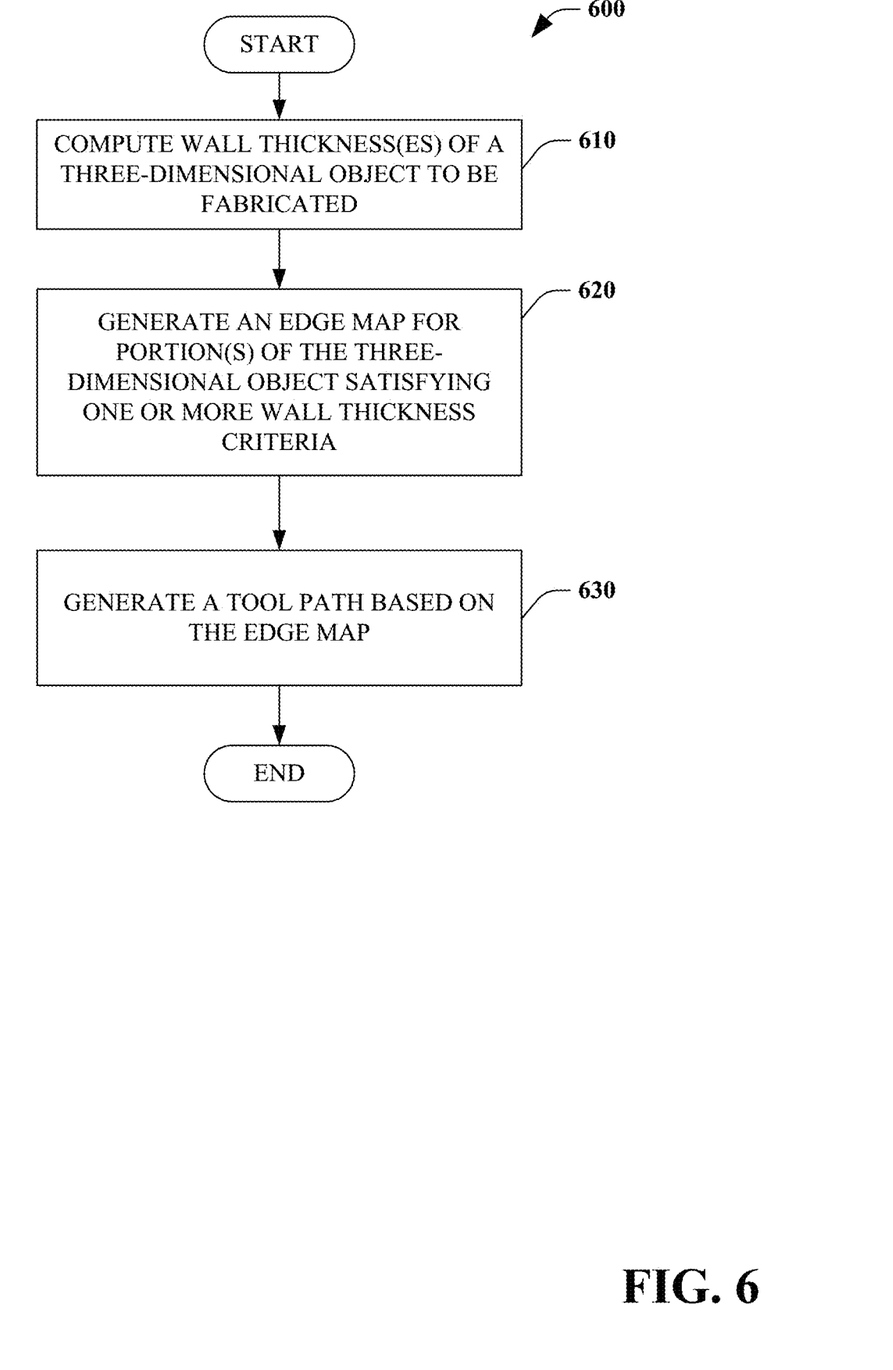
FIG. 6 illustrates an exemplary methodology of detecting and compensating for an anomaly in three-dimensional object fabrication.
Figure 7:
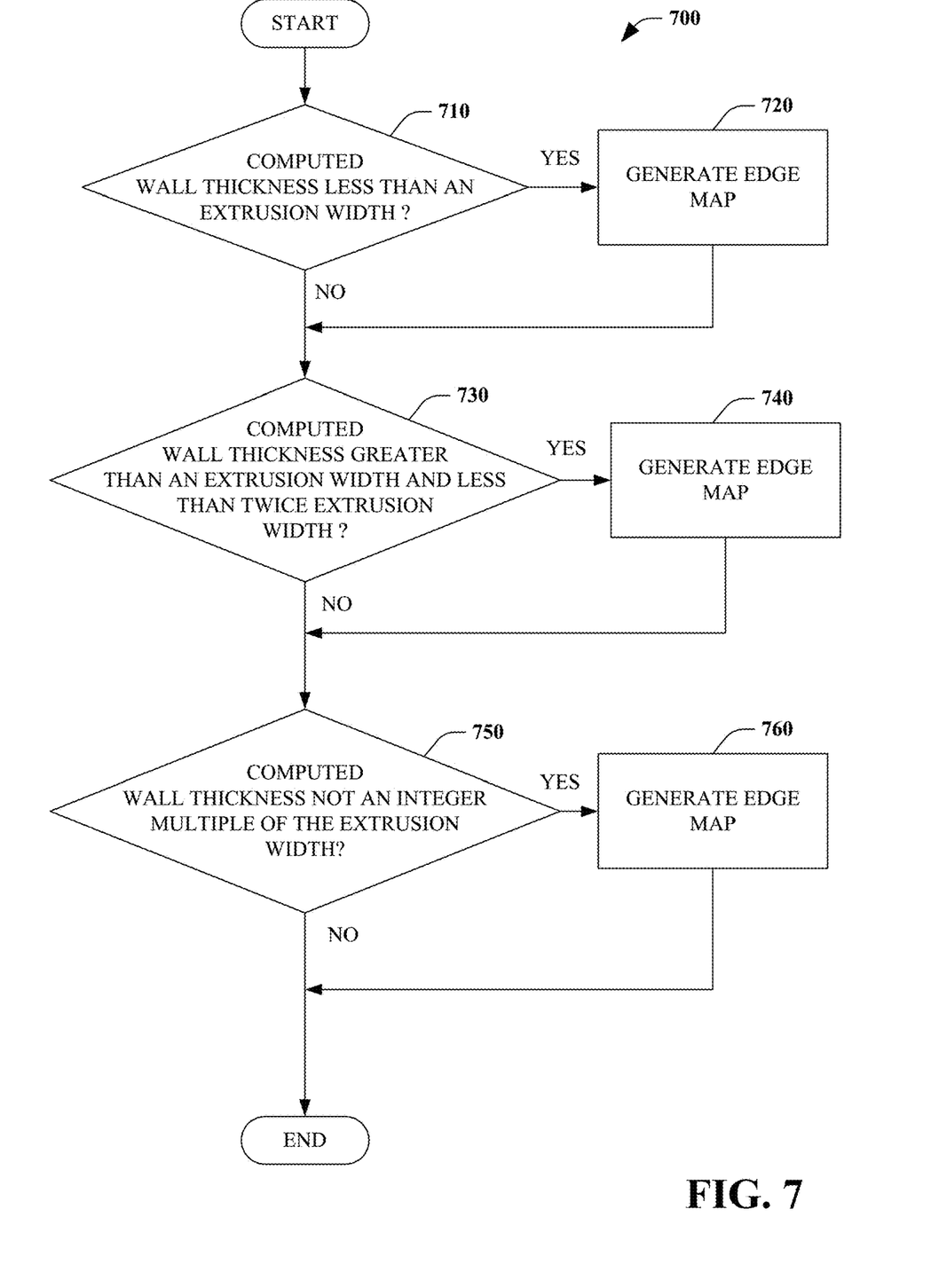
FIG. 7 illustrates an exemplary methodology of generating an edge map.

FIGS. 6 and 7 illustrate exemplary methodologies relating to detecting and compensating for an anomaly in three-dimensional object fabrication. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 6, a method of detecting and compensating for an anomaly in three-dimensional object fabrication 600 is illustrated. At 610, wall thickness(es) of a three-dimensional object to be fabricated are computed. In one embodiment, the wall thicknesses of the three-dimensional object to be fabricated are computed for all sliced layers. At 620, an edge map is generated for portions(s) of the three-dimensional object satisfying one or more wall thickness criteria. At 630, a tool path is generated based on the edge map.

Turning to FIG. 7, a method of generating an edge map 700 is illustrated. At 710, a determination is made as to whether a computed wall thickness is less than an extrusion width. If the determination at 710 is YES, at 720, an edge map is generated (e.g., by an edge map generation component 140) for object(s), portion(s) and/or part(s) having a wall thickness less than the extrusion width of the fabrication apparatus and processing continues at 730. If the determination at 710 is NO, processing continues at 730.

At 730, a determination is made as to whether a computed wall thickness is greater than extrusion width and less than twice the extrusion width. If the determination at 730 is YES, at 740, an edge map is generated (e.g., by an edge map generation component 140) for thin wall parts having a thickness greater than the extrusion width and less than twice the extrusion width and processing continues at 750. If the determination at 730 is NO, processing continues at 750.

At 750, a determination is made as to whether a computed wall thickness is not an integer multiple of the extrusion width. If the determination at 750 is YES, at 760, an edge map is generated (e.g., by an edge map generation component 140) for parts not an integer multiple of the extrusion width and no further processing occurs. If the determination at 750 is NO, no further processing occurs.

Figure 8:
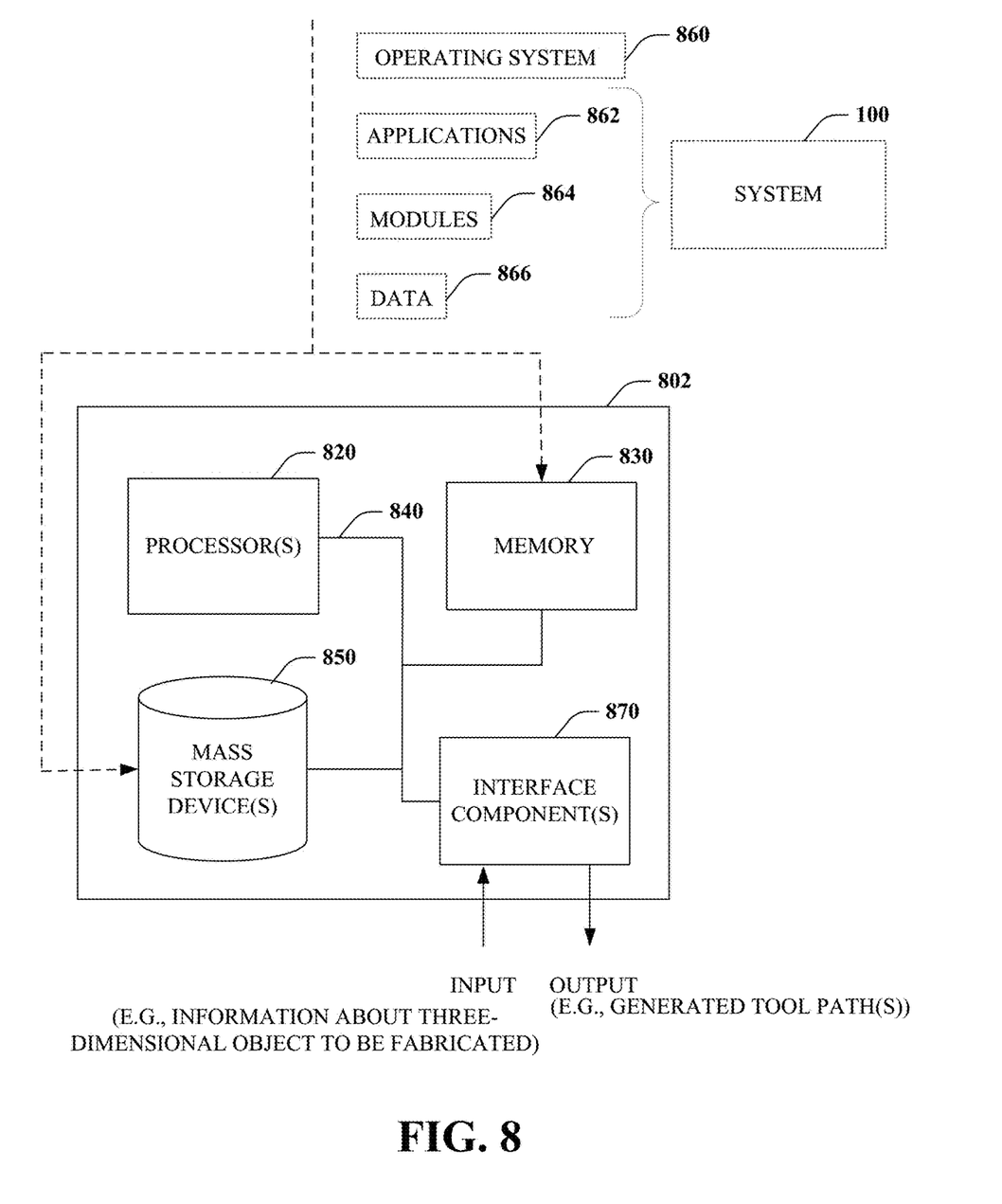
FIG. 8 is a functional block diagram that illustrates an exemplary computing system.

With reference to FIG. 8, illustrated is an example general-purpose computer or computing device 802 (e.g., mobile phone, desktop, laptop, tablet, watch, server, handheld, programmable consumer or industrial electronics, set-top box, game system, compute node, etc.). For instance, the computing device 802 may be used in a system for detecting and compensating for an anomaly in three-dimensional object fabrication 100.

The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830. The instructions may be, for instance, instructions for implementing functionality described as being carried out by one or more components discussed above or instructions for implementing one or more of the methods described above.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory, etc.) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device (s) 850 to perform one or more actions. Accordingly, applications 862 can turn a general-purpose computer 802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 862, and include one or more modules 864 and data 866 stored in memory and/or mass storage device(s) 850 whose functionality can be realized when executed by one or more processor(s) 820.

In accordance with one particular embodiment, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g., serial, parallel, PCMCIA, USB, FireWire, etc.) or an interface card (e.g., sound, video, etc.) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 870 can be embodied as an output peripheral interface to supply output to displays (e.g., LCD, LED, plasma, etc.), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for detecting and compensating for an anomaly in three-dimensional object fabrication, comprising:
   a computer comprising a processor and a memory, the memory comprising:
      a wall thickness computation component configured to compute a wall thickness of a three-dimensional object to be fabricated using a straight skeleton technique;
      an edge map generation component configured to generate an edge map for one or more portions of the three-dimensional object to be fabricated satisfying one or more wall thickness criteria, the edge map comprising a connection of computed straight skeleton vertices satisfying the one or more wall thickness criteria, wherein the wall thickness criteria comprise a wall thickness less than an extrusion width of a fabrication apparatus; and
      a tool path generation component configured to generate a tool path based on the generated edge map, the tool path comprising an instruction to control movement of a component of the fabrication apparatus in order to compensate for the extrusion width of the fabrication apparatus.

2. The system of claim 1, wherein the wall thickness criteria comprise a computed wall thickness less than an extrusion width of the fabrication apparatus.

3. The system of claim 2, wherein the extrusion width is obtained electronically from the fabrication apparatus.

4. The system of claim 2, wherein the extrusion width is obtained from a user of the system.

5. The system of claim 1, wherein the wall thickness criteria comprise a computed wall thickness greater than an extrusion width and less than twice the extrusion width.

6. The system of claim 5, wherein the extrusion width is obtained electronically from the fabrication apparatus.

7. The system of claim 1, wherein the wall thickness criteria comprise a computed wall thickness not an integer multiple of the extrusion width.

8. The system of claim 7, wherein the extrusion width is obtained electronically from the fabrication apparatus.

9. The system of claim 1, wherein the generated tool path increases a flow of material of a nozzle of the fabrication apparatus.

10. A method of detecting and compensating for an anomaly in three-dimensional object fabrication, comprising:
    computing a wall thickness of a three-dimensional object to be fabricated using a straight skeleton technique;
    generating an edge map for one or more portions of the three-dimensional object satisfying one or more wall thickness criteria, the edge map comprising a connection of computed straight skeleton vertices satisfying the one or more wall thickness criteria, wherein the wall thickness criteria comprise a wall thickness less than an extrusion width of a fabrication apparatus; and
    generating a tool path based on the edge map, the tool path comprising an instruction to control movement of a component of the fabrication apparatus in order to compensate for the extrusion width of the fabrication apparatus.

11. The method of claim 10, wherein the wall thickness criteria comprise a computed wall thickness less than an extrusion width of the fabrication apparatus.

12. The method of claim 10, wherein the wall thickness criteria comprise a computed wall thickness greater than an extrusion width and less than twice the extrusion width.

13. The method of claim 10, wherein the wall thickness criteria comprise a computed wall thickness not an integer multiple of the extrusion width.

14. The method of claim 13, wherein the extrusion width is obtained from at least one of a user or electronically from the fabrication apparatus.

15. The method of claim 10, wherein the generated tool path performs at least one of reduces a flow of material of a nozzle of the fabrication apparatus, increases the flow of material of the nozzle of the fabrication apparatus or reduces a speed of travel of the nozzle of the fabrication apparatus.

16. A computer storage media storing computer-readable instructions that when executed cause a computing device to:
    compute a wall thickness of a three-dimensional object to be fabricated using a straight skeleton technique;
    generate an edge map for one or more portions of the three-dimensional object satisfying one or more wall thickness criteria, the edge map comprising a connection of vertices satisfying the one or more wall thickness criteria, wherein the wall thickness criteria comprise a wall thickness less than an extrusion width of a fabrication apparatus; and
    generate a tool path based on the edge map, the tool path comprising an instruction to control movement of a component of the fabrication apparatus in order to compensate for the extrusion width of the fabrication apparatus.

17. The computer storage media of claim 16, wherein the wall thickness criteria comprise a computed wall thickness less than an extrusion width of the fabrication apparatus.

18. The computer storage media of claim 16, wherein the wall thickness criteria comprise a computed wall thickness greater than an extrusion width and less than twice the extrusion width.

* * * * *